2,895,932

CERTAIN ISOPHTHALIC AND ORTHOPHTHALIC ACID ALKYD RESINS

Maurice J. Schlatter, Berkeley, and Funston G. Lum, Richmond, Calif., assignors to California Research Corporation, San Francisco, Calif., a corporation of Delaware No Drawing. Application October 5, 1954
Serial No. 460,520

4 Claims. (Cl. 260—22)

The present invention relates to a new kind of oil-modified alkyd resin. More particularly, it relates to oil-modified fast-drying alkyd resins produced from certain alkyl-substituted phthalic acids and aliphatic saturated polyhydric alcohols, and modified by the introduction of monocarboxylic fatty acids derived from vegetable oils and animal fats to replace a portion of the alkyl-substituted phthalic acid in the final resin. Still more particularly, the invention relates to short-oil (35 to 45% oil) and medium-oil (45 to 60% oil) alkyd resins of 5-tert.-butyl isophthalic acid characterized by an unusual degree of hardness and excellent resistance to alkalies of the films brushed out on different kinds of surfaces from solutions of these short-oil resins in an appropriate aromatic solvent, e.g., xylene, or in a mixture of aromatic and aliphatic hydrocarbon solvents, e.g., xylene and mineral spirits, or in an aliphatic hydrocarbon solvent, such as mineral spirits.

The term "alkyd resin," employed in a broad sense, refers to polymeric polyesters of polyhydric alcohols and resinifying polycarboxylic acids. As it is known, oil-modified alkyd resins are usually prepared by two general processes: (1) the fatty acid process and (2) the monoglyceride process. Details of these two processes can be found in numerous publications of the alkyd art, e.g., at pages 287–292 of volume I of "Organic Coating Technology," by H. F. Payne (John Wiley & Sons, 1954).

Ortho-phthalic acid in the form of phthalic anhydride represents the most frequently employed polycarboxylic acid for the preparation of alkyd resins, although lately its two isomers, isophthalic and terephthalic acids, have been proposed as effective substituents thereof in a number of applications. These phthalic alkyd resins finding their chief utilization as constituents of paints and varnishes in the field of surface-coatings, may be divided into several groups according to their relative content of oil (oil length), calculated in percent by weight as fatty acid ester of the polyhydric alcohol or alcohols employed for the preparation of a particular resin. Thus, there are: short-oil alkyds with oil lengths from about 35 to about 45% oil, medium-oil alkyds with oil lengths from about 45 to about 60%, and long-oil alkyds with oil lengths above about 60% and as high as 85%. The various alkyd resins are dissolved in appropriate hydrocarbon solvents to provide liquid formulations of diverse surface-coating compositions, and the oil modification of these resins permits of varying film characteristics and techniques of application and hardening of the formulations.

Alkyl-substituted phthalic acids reported in the prior art have not been so far considered suitable materials for the preparation of alkyd resins, since the presence of a hydrocarbon substitution in the form of alkyl chains in the molecule of such acids tended to suggest a lowered softening point for the corresponding alkyd resins and, consequently, a slower rate of drying and a softer film, were the solutions of such resins ever applied in surface-coatings.

We have found entirely unexpectedly, however, that the reaction of 5-tert.-butyl isophthalic acid with appropriate polyhydric alcohols, modified by monocarboxylic fatty acids, produces short-oil, medium-oil and long-oil resins which, on being dissolved in suitable hydrocarbon solvents and applied as surface-coatings, dry more rapidly than ortho-phthalate resins of the same oil content and of the same viscosity. The oil-modified resins produced in this manner from 5-tert.-butyl isophthalic acid are characterized by excellent thermal stability and can be cooked at higher temperatures than the corresponding ortho-phthalate resins without any discoloration or decomposition. This feature of the new alkyd resins of the present invention constitutes a decided advantage with respect to the preparation of resin formulations of desired characteristics (viscosity and acid number).

Furthermore, we have found that the clear films produced by applying coatings of short-oil (35 to 45% oil) and medium-oil (45 to 60% oil) alkyd resins derived from 5-tert.-butyl isophthalic acid are considerably harder than those produced by coatings containing alkyd resins derived from ortho-phthalic acid (phthalic anhydride) and from its isomer, isophthalic acid. Additionally, these films are far more resistant to alkaline reagents, such as soap, than the ortho-phthalate and isophthalate resin films, and this is particularly true of baked films.

The exact reasons for the greater hardness and resistance to alkalies displayed by alkyd resins derived from 5-tert.-butyl isophthalic acid is not entirely understood. However, it is theorized that the cause lies in the high dipole moment of 5-tert.-butyl isophthalic acid, due to the presence of the tertiary-butyl group which is electron-donating and of the two carboxyl groups which attract the electrons. The same considerations apply in the case of 4-tert.-butyl ortho-phthalic acid which can be employed in lieu of 5-tert.-butyl isophthalic acid for the preparation of short to medium-oil alkyds (35 to 60% oil) capable of producing similar hard, alkali-resistant films when applied in surface-coatings in accordance with the invention.

The polyhydric alcohols suitable for the preparation of alkyd resins of our invention are the following: For the preparation of resins having oil lengths from 35 to 45%, glycerol, trimethylolethane and trimethylolpropane; for the preparation of resins with oil lengths from 45 to 60%, glycerol and mixtures of glycerol and pentaerythritol; for the preparation of resins having oil lengths from 60 up to 75%, pentaerythritol; and for the preparation of resins with oil lengths above 75%, pentaerythritol in combination with various polypentaerythritols such as di-pentaerythritol or tri-pentaerythritol, or any of these polypentaerythritols alone.

The 5-tert.-butyl isophthalic acid and 4-tert.-butyl ortho-phthalic acid to be reacted with the corresponding polyhydric alcohol or alcohols may be prepared by nitric acid or potassium permanganate oxidation of tert.-butyl metaxylene or tert.-butyl, ortho-xylene, or by other convenient methods of the art.

In order to modify the alkyd resins prepared in accordance with the present invention, so as to enable preparation of surface-coating compositions, drying oils such as linseed oil, tung oil, oiticica oil, perilla oil and dehydrated castor oil, may be employed in such amounts as would be required for imparting the viscosity and other characteristics required by the particular application. Among suitable semi-drying oils, the following may be mentioned: soybean oil, safflower oil, sunflower oil and walnut oil. For certain specific applications, for instance, to prepare alkyd resin enamels suitable for the production of glossy films such as are required in the manufacture of refrigerators, non-drying oils, e.g., coconut oil, may be successfully employed. Fatty acids of the aforementioned drying, semi-drying and non-drying oils may also be used for preparing oil-modified alkyd resins of the invention, whenever the fatty acid process technique is employed for their preparation.

Whenever it is desired to reduce the functionality and to prevent gelation, glycols, such as ethylene glycol, may be used as a replacement of the higher functional alcohol in amounts ranging from 5 to 50% by weight thereof. Lower molecular weight aromatic monocarboxylic acids, e.g., benzoic or toluic acid, may also be employed for the purpose in the preparation of alkyd resins derived from tert.-butyl-substituted phthalic acids in accordance with the present invention in amounts equal to from 5 to 35% by weight of the particular tert.-butyl-phthalic acid employed. As the oil content of the alkyd resin increases, polyhydric alcohols of higher functionality will be employed, or heat-bodying may be resorted to in order to raise the molecular weight and viscosity.

The oil-modified alkyd resins of our invention are prepared in practice by either of the two previously mentioned general processes: the fatty acid process or the monoglyceride process. In the first case, materials are fused together either in the presence or in the absence of a solvent. In the second case the fatty oil is first subjected to alcoholysis for the purpose of producing a mixture of partial esters (glycerides and/or pentaerythritides) whereupon the mixture of partial esters is condensed with the 5-tert.-butyl isophthalic or 4-tert.-butyl ortho-phthalic acid by heating the reactants at a temperature in the range from 215 to 290° C. until the resulting resin has an acid number of about 5 to 20 and possesses the desired viscosity. Excess of glycerol (up to 5%, by weight of the resin) may be employed to reduce the acid number to the desired value. After this, the condensation product is diluted to the required solid content. Should the oil length of the resin be higher than 50%, mineral spirits is preferably used to thin it to a solid content of 60%. If the oil length is short, that is, less than about 50%, the condensation product is thinned to 50% solids with a stronger solvent than mineral spirits, preferably xylene.

A number of compositions prepared in accordance with the invention were thinned with hydrocarbon solvents to provide surface-coating solutions and then brushed out in films which were subsequently subjected to air-drying and baking. All test solutions contained a mixed naphthenate drier (0.03% by weight of cobalt and 0.3% by weight of lead on a non-volatile basis). The drying time, the hardness and alkali resistance of the air-dried films were observed, as well as the hardness and the alkali resistance of the baked films. The results of these observations were compared with the results obtained with films brushed out from solutions containing alkyd resins derived from unsubstituted ortho-phthalic acid (as anhydride) and isophthalic acid. The alkali resistance of air-dried films was determined and rated as follows:

Window glass panels 2½" by 6" in size were coated with a film of the resin, about 1.5 mils thick and having a 50% by weight solids content. These panels were immersed into a solution of 3% sodium hydroxide. The alkali resistance was rated as follows: the rating of 1 was assigned to the films which became disintegrated in 15 minutes or a longer period of time; films disintegrating in 10 to 15 minutes were assigned a rating of 2; disintegration in 5 to 10 minutes corresponded to a rating of 3; and, finally, disintegration in less than 5 minutes was given a rating of 4.

For baked films, prepared by baking in a conventional oven at 130° C. for 1 hour, the ratings ranged from 1 to 4, but in this case, the rating of 1 corresponded to a film which remained intact after 24 hours of immersion into the alkaline solution (3% NaOH); that of 2 to a film lifting partly after 12 hours and disintegrating before 24 hours. Rating of 3 was assigned to films lifting in 2 hours and disintegrating in 3 hours; and rating of 4 to the films disintegrating in less than 1 hour.

The viscosity was determined on a Gardner-Holdt bubble viscometer at 25° C. Hardness of films was obtained employing Sward-Rocker (cf. "Physical and Chemical Examination of Paints, Varnishes, Lacquers and Colors," by H. A. Gardner and G. G. Sward, 11th edition, pages 164–165).

These comparison data are offered in the following table:

| Run No. | Phthalic acid | Polyhydric alcohol | Modifying oil | Composition of resin in parts by weight | | Excess of glycerol in parts by weight (f) | Reaction conditions |
|---|---|---|---|---|---|---|---|
| | | | | Phthalate | Oil | | |
| 1 | 5-tert.-butyl isophthalic | Glycerol | Soybean | 45 | 55 | 1.7 | 9 hours, 230° C. |
| 2 | Ortho-phthalic (as anhydride) | do | do | 40 | 60 | | (a). |
| 3 | do | do | do | 45 | 55 | | (b). |
| 4 | 5-tert.-butyl isophthalic | do | do | 33 | 67 | 1.2 | 14 hours, 260° C. |
| 5 | Isophthalic | do | do | 33 | 67 | 1.6 | 10 hours, 260° C. |
| 6 | Ortho-phthalic (as anhydride) | do | do | 33 | 67 | 1.6 | 15 hours, 260° C. |
| 7 | 5-tert.-butyl isophthalic | do | do | e 60 | 40 | 2.9 | 2½ hours, 260° C. |
| 8 | 4-tert.-butyl ortho-phthalic | do | do | 53 | 47 | 1.9 | 9 hours, 230° C. |
| 9 | 5-tert.-butyl isophthalic | Pentaerythritol | do.g | 25 | 75 | i 0.6 | 6 hours, 260° C.; 3 hours, 275° C. |
| 10 | Isophthalic | do | do | 25 | 75 | i 0.9 | 2 hours, 260° C.; 3½ hours, 275° C. |
| 11 | 5-tert.-butyl isophthalic | Glycerol | do | 46 | 54 | 2.3 | 9½ hours, 230° C. |
| 12 | Isophthalic | Glycerol and ethylene glycol | do | d 60 | 40 | 2.3 | 6 hours, 230–250° C. |
| 13 | Isophthalic (benzoic acid added) | Glycerol | do | e 60 | 40 | 4.0 | 7 hours, 215–230° C. |
| 14 | Isophthalic | do | do | 57 | 43 | 9.2 | 3½ hours, 230° C. |
| 15 | Ortho-phthalic (as anhydride) | do | do | 61 | 39 | | (c). | a b c Sample of commercial alkyd resin.
d 34 parts as glycol phthalate and 26 parts as glyceryl phthalate.
e 50 parts as glyceryl phthalate and 10 parts as glyceryl benzoate.
f Added to reduce the acid number to a value of 10–15.
g Soybean oil as penta-ester.
i Pentaerythritol.

| Run No. | Phthalic acid | Viscosity of resin solution (Gardner-Holdt) | Air dried films ||||||| Alkali resistance | Baked films ||
|---|---|---|---|---|---|---|---|---|---|---|---|
| | | | Drying times in hours ||| Sward hardness ||| | Sward hardness | Alkali resistance |
| | | | Set to touch | Dust free | Tack free | 1 day | 2 days | 5 days | | | |
| 1 | 5-tert.-butyl isophthalic | Z-1, 60% in mineral spirits | <½ | ½ | 1½ | 16 | 21 | 27 | 1 | | |
| 2 | Ortho-phthalic (as anhydride) | Z2-Z3, 60% in mineral spirits | 1 | 2 | 4½ | 6 | 9 | 9 | 4 | | |
| 3 | do | Z1-Z2, 60% in mineral spirits | ½ | 1 | 4½ | 10 | 15 | 15 | 3 | | |
| 4 | 5-tert.-butyl isophthalic | F, 60% in mineral spirits | 1 | 1½ | 4 | 4 | 7 | 7 | 2 | | |
| 5 | Isophthalic | W, 60% in mineral spirits | ¾ | 1 | 2½ | 4 | 7 | 7 | 4 | | |
| 6 | Ortho-phthalic (as anhydride) | E, 60% in mineral spirits | 1½ | 1¾ | 4½ | 3 | 5 | 5 | 4 | | |
| 7 | 5-tert.-butyl isophthalic | M, 60% in xylene | ⅔ | ¾ | 1½ | 22 | | 26 | 1 | 52 | 1 |
| 8 | 4-tert.-butyl ortho-phthalic | W, 60% in mineral spirits | 1¼ | 1½ | 2¼ | 22 | | 29 | 1 | 59 | 1 |
| 9 | 5-tert.-butyl isophthalic | R-S, 60% in mineral spirits | ⅔ | ⅝ | 2¼ | 4 | | 6 | 1 | 18 | 2 |
| 10 | Isophthalic | W, 60% in mineral spirits | ⅝ | 1 | 2 | 2 | | 4 | 3 | 14 | 3 |
| 11 | 5-tert.-butyl isophthalic | do | 1½ | 1¾ | 3½ | 12 | 17 | 27 | 1 | 53 | 1 |
| 12 | Isophthalic | Y, 50% in xylene | ¾ | 1 | 2¼ | 14 | 18 | 25 | 2 | 45 | 2 |
| 13 | Isophthalic (benzoic acid added) | Z-21, 50% in xylene | ½ | ¾ | 2 | 16 | 22 | 30 | 2 | 48 | 2 |
| 14 | Isophthalic | Z1-Z2, 50% in xylene | 1 | 1¼ | 2½ | 13 | 17 | 23 | 4 | 50 | 4 |
| 15 | Ortho-phthalic (as anhydride) | Z1-Z2, 50% in 3:1 solution of xylene and in mineral spirits | 1 | 1¼ | 5½ | 12 | 17 | 21 | 3 | 30 | 3 |

The results presented in the table unambiguously demonstrate the superiority of alkyd resins prepared in accordance with the invention.

Films of oil-modified alkyd resins derived from 5-tert.-butyl isophthalic and 4-tert.-butyl ortho-phthalic acids, when exposed to the air, dry as fast and faster than the comparable films of alkyd resins derived from phthalic anhydride (compare, e.g., run number 1 to run number 3, and run number 7 to run number 15). In all runs where films of alkyd resins derived from tert.-butyl-substituted phthalic acids were tested, these films displayed better alkali resistance (runs numbers 1, 4, 7, 8, 9 and 11). The same observations as to resistance to alkalies could be made with respect to baked films.

Results of determinations of Sward hardness carried out on air-dried and baked films positively show that short-oil and medium-oil resins derived from tert.-butyl substituted phthalic acids in accordance with the invention are much harder than those derived from conventional ortho-phthalate resins and at least as hard as those derived from isophthalate resins (e.g., run number 1 compared to run number 3). The films prepared from medium-oil (45 to 60%) resins of the present invention are observed to be harder and more alkali-resistant (runs numbers 1 and 11) than those produced with low-oil ortho-phthalate resins (run number 15), and just as hard and alkali-resistant as low-oil isophthalate resins (runs numbers 12, 13 and 14).

Because of many variations of the aforedescribed invention, which may be made without departing from the spirit and scope thereof, it is to be understood that all such variations are intended to be encompassed within the terms of the following claims.

We claim:

1. In the process of preparing oil-modified alkyd resins having an oil length of 35 to 85% and an acid number of about 5 to 20, by condensing as essentially the sole ingredients a phthalic acid and a fatty acid partial ester of polyhydric alcohol, the improvement of increasing the hardness and alkali resistance of said resins which comprises employing a partial ester of polyhydric alcohol and a fatty acid derived from natural glyceride oils, said partial ester having an average of about 1.5 to 2.5 free hydroxyl groups; and as the phthalic acid, an acid selected from the group consisting of 5-t-butyl isophthalic acid and 4-t-butyl orthophthalic acid, said phthalic acid being employed in amounts of about 0.8 to 0.9 equivalents per free hydroxyl group of said ester.

2. Composition prepared in accordance with claim 1.

3. The improvement of claim 1 wherein the phthalic acid employed is 5-t-butyl isophthalic acid.

4. Composition prepared in accordance with claim 3.

References Cited in the file of this patent

UNITED STATES PATENTS

| 2,627,508 | Lum | Feb. 3, 1953 |
| 2,742,445 | Lum | Apr. 17, 1956 |

OTHER REFERENCES

J. A. C. S. 64, 1662–65, July 1942.